(12) United States Patent
Van Der Wal et al.

(10) Patent No.: US 8,134,352 B2
(45) Date of Patent: Mar. 13, 2012

(54) SWITCHED MODE POWER SUPPLY INCLUDING POWER SUPPLY UNITS AND CONTROLLER

(75) Inventors: Roelf Van Der Wal, Eindhoven (NL); Jacobus Josephus Leijssen, Eindhoven (NL); Josephus Adrianus Maria Van Erp, Eindhoven (NL); Machiel Antonius Martinus Hendrix, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 995 days.

(21) Appl. No.: 10/596,542

(22) PCT Filed: Dec. 3, 2004

(86) PCT No.: PCT/IB2004/052654
§ 371 (c)(1),
(2), (4) Date: Nov. 17, 2008

(87) PCT Pub. No.: WO2005/064778
PCT Pub. Date: Jul. 14, 2005

(65) Prior Publication Data
US 2009/0067199 A1    Mar. 12, 2009

(30) Foreign Application Priority Data
Dec. 22, 2003 (EP) ..................... 03104903

(51) Int. Cl.
G05F 3/16    (2006.01)

(52) U.S. Cl. ..................... 323/272; 323/225
(58) Field of Classification Search ........ 323/225, 323/271, 272; 363/65
See application file for complete search history.

(56) References Cited

U.S. PATENT DOCUMENTS

| | | | | |
|---|---|---|---|---|
| 4,677,614 A | * | 6/1987 | Circo | 370/222 |
| 5,875,104 A | * | 2/1999 | Prager | 363/65 |
| 6,081,104 A | * | 6/2000 | Kern | 323/268 |
| 6,157,182 A | * | 12/2000 | Tanaka et al. | 323/284 |
| 6,281,666 B1 | * | 8/2001 | Tressler et al. | 323/272 |
| 6,788,036 B1 | * | 9/2004 | Milavec et al. | 323/272 |
| 2002/0113557 A1 | * | 8/2002 | Langeslag et al. | 315/219 |
| 2003/0218893 A1 | * | 11/2003 | Tai et al. | 363/65 |

* cited by examiner

*Primary Examiner* — Gary L Laxton
*Assistant Examiner* — Gustavo Rosario Benitez

(57) ABSTRACT

A switched mode power supply assembly (1) is described, comprising at least two switched mode power supply units ($10_i$) coupled to each other in parallel; each power supply unit ($10_i$) having an output stage ($50_i$, $60_i$) capable of selectively operating in a first mode wherein its output signal ($I_{OUT,i}$) is increasing and operating in a second mode wherein its output signal ($I_{OUT,i}$) is decreasing; a control device (100) receiving mode switch control signals from all power supply units ($10_i$); wherein the control device (100), if it finds that the actual phase relationship between two power supply units deviates from an optimal phase relationship, is designed to generate synchronising control signals for at least one power supply unit ($10_2$), effectively changing the timing of at least one mode switch moment, such that the deviation between the actual phase relationship and said optimal phase relationship is reduced.

16 Claims, 8 Drawing Sheets

SWITCHED MODE POWER SUPPLY INCLUDING POWER SUPPLY UNITS AND CONTROLLER

The present invention relates in general to a switched mode power supply. Particularly, the present invention relates to a DC/DC converter stage or a DC/AC inverter stage, receiving a substantially constant input voltage or current and generating a DC or AC output voltage or current. Also, the present invention relates to a switching current-controlled amplifier. In the following, the present invention will be explained for the case of a converter which receives a constant input voltage and generates an output current, but this is merely by way of example and not intended to restrict the present invention.

BACKGROUND OF THE INVENTION

Switched mode power supplies of the above-described type are generally known, and they are commercially available for several applications.

In one example, the switched mode power supply is implemented as a boost converter, for converting the output voltage of a solar cell array (in the order of 100 V) to a higher constant DC level in the order of about 420 V, i.e. higher than the maximum voltage of the standard mains voltage. With such converter, it is possible to transfer energy from solar cells to the mains.

In another example, the switched mode power supply is implemented as a DC/AC inverter, for generating an AC current from a DC voltage. Such inverter can be used in, for instance, a lamp driver, having an input for connection to AC mains, and having a driver output for driving a discharge lamp. Such drivers typically comprise a stage where a substantially constant voltage is generated from the alternating input voltage, followed by a stage where an alternating current is generated on the basis of said constant voltage.

In yet another example, the switched mode power supply is implemented as a transconductance amplifier for driving an actuator in a motion control apparatus.

Generally speaking, switched mode power supplies have been developed for a specific output power. Generally speaking, for a higher output power, the size of the components used in the power supply must be larger. This can be avoided by using a power supply assembly comprising two or more power supply units connected in parallel. In that case, each individual power supply unit only needs to provide a relatively low power so that the size of the individual components can be relatively small, which implies a reduction of costs. Also, an advantage would be that use could be made of low-power supply units which have already been developed and which have already proven themselves, without the need of developing a complete new high-power converter. Further, it is an advantage that low-power supply units can easily be manufactured, and that high-volume production facilities already exist.

A further advantage of using multiple power supply units connected in parallel is to be recognized in the fact that it is possible to generate an output current with a low ripple amplitude. FIG. 1 illustrates a time graph of a typical power supply output current I, which successively rises (line 101) and falls (line 102) between an upper level $I_H$ (line 103) and a lower level $I_L$ (line 104). On a sufficiently large time scale, such current can be considered as being a constant current having a magnitude $I_{AV} = 0.5 \cdot (I_H + I_L)$, and having a ripple amplitude $0.5 \cdot (I_H - I_L)$.

In principle, it would be possible to have each power supply unit of a power supply assembly operate completely independently from all the other power supply units. Then, however, it may happen that the units operate in phase, in which case the ripple amplitude of the overall output current of the power supply assembly is the summation of the individual output ripple amplitudes of the individual power supply units. A general aim of the present invention is to have the ripple as small as possible.

Further, a disadvantage of independently operating units is that subharmonics may be caused in the output current, i.e. signal variations having a frequency equal to the difference frequency of the switching of two units. A further aim of the present invention is to prevent such subharmonics as much as possible.

Therefore, it is preferred that the power supply units operate in synchronization, such that their output peaks are distributed evenly in time. FIG. 2 is a graph illustrating this for a case of two power supply units, providing output currents I1 and I2, respectively, in a 180° phase relationship with each other. It can easily be seen that, if the individual currents I1 and I2 have the same amplitude, and if the rate of increase dI/dt from the lower peak to the higher peak is equal to the rate of decrease dI/dt from the higher peak to the lower peak, the resulting current $I_{total}$ is substantially constant, having no ripple or only a very small ripple. Even when said individual currents do not have ideal match, typically a reduction of the ripple amplitude is achieved anyway.

Generally, when N represents the number of power supply units, these units are ideally operating in a 360°/N phase relationship with each other.

Operating power supply units in a power supply assembly such that they operate in synchronization but with shifted phases is indicated as "interleaved" operation. Interleaved operation relevant to the field of application considered here has already been proposed in the publication "interleaved converters based on hysteresis current control" by J. S. Batchvarov et al, 2000, I.E.E.E. 31st Annual Power Electronics Specialists Conference, page 655. In this proposal, relating to an assembly of two converter units, one of the converter units has the status of master whereas the other converter unit has the status of slave. The proposed control circuitry of this proposal is rather complicated.

SUMMARY OF THE INVENTION

It is a general objective of the present invention to provide an improved power supply assembly.

Especially, it is an important objective of the present invention to provide a power supply assembly comprising two or more power supply units operating in an interleaved manner, having a relatively simple control circuitry.

In an earlier, non-published patent application, the same inventor has proposed a power supply assembly wherein each power supply unit generates control signals for the next power supply unit in line, and receives control signals from the previous power supply unit in line. The last power supply unit generates control signals for the first power supply unit in line, so that the power supply units of the power supply assembly are arranged in a ring-configuration. The control signals are such that an interleaved operation is automatically assured. Particularly, the control signals are such that the switching frequency of a delayed supply unit is increased slightly, whereas the switching frequency of an advanced supply unit is decreased slightly. More particularly, the control signals generated by a power supply unit comprise ramping voltages which are to be added to reference voltages. Thus, it is automatically assured that the consecutive supply units have substantially the same phase difference with respect to their neighbours. Although this earlier solution operates satisfactorily, it has a disadvantage of increased complexity, i.e. increased number of components, as compared to a power supply assembly where the power supply units are running independently.

An important objective of the present invention is to provide a power supply assembly having the same advantageous features of this earlier proposal without having said disadvantage.

According to an important aspect of the present invention, the power supply units of the power supply assembly of the present invention are controlled by one common control device, which is capable of detecting the phase relationships of the individual power supply units, and which is designed to generate its control signals for the individual power supply units such that the switching frequency of a delayed supply unit is increased slightly, whereas the switching frequency of an advanced supply unit is decreased slightly.

BRIEF DESCRIPTION OF THE DRAWINGS

These and other aspects, features and advantages of the present invention will be further explained by the following description of a preferred embodiment of a power supply assembly according to the present invention with reference to the drawings, in which same reference numerals indicate same or similar parts, and in which.

In the following, the present invention will be explained in detail for the case of a converter assembly, unless specified specifically. However, it is to be noted that this explanation is not intended to restrict the present invention to converters only; it is specifically noted that same or similar principles also apply to inverters, amplifiers, etc, as will be clear to persons skilled in the art.

Figure 1:
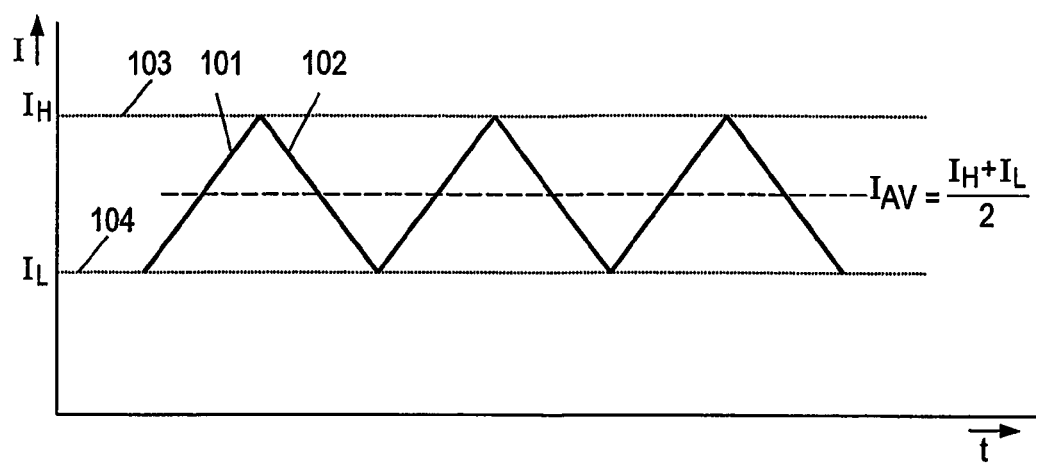
FIG. 1 is a time graph schematically illustrating that an AC signal on a small time scale may result in a constant signal on al larger time scale.
Figure 2:
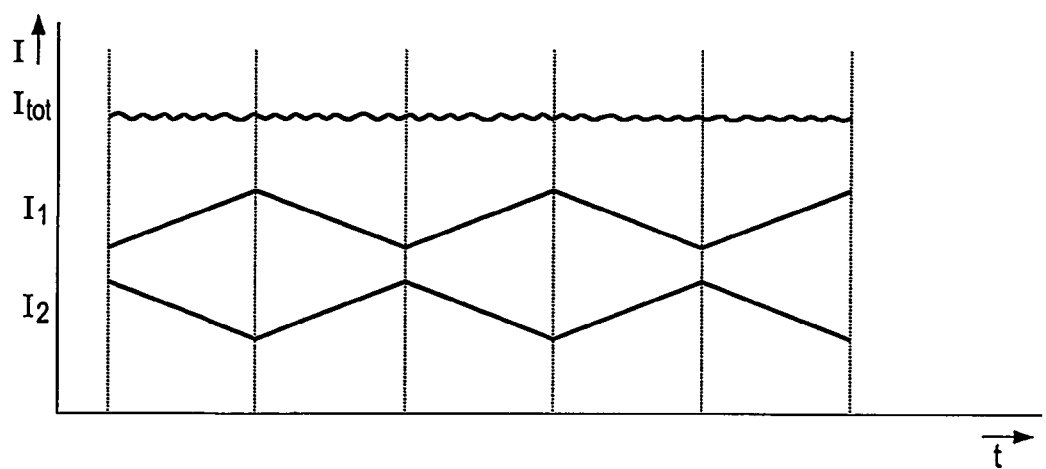
FIG. 2 is a time graph schematically illustrating that the ripple components of two signals added together may compensate each other.
Figure 3:
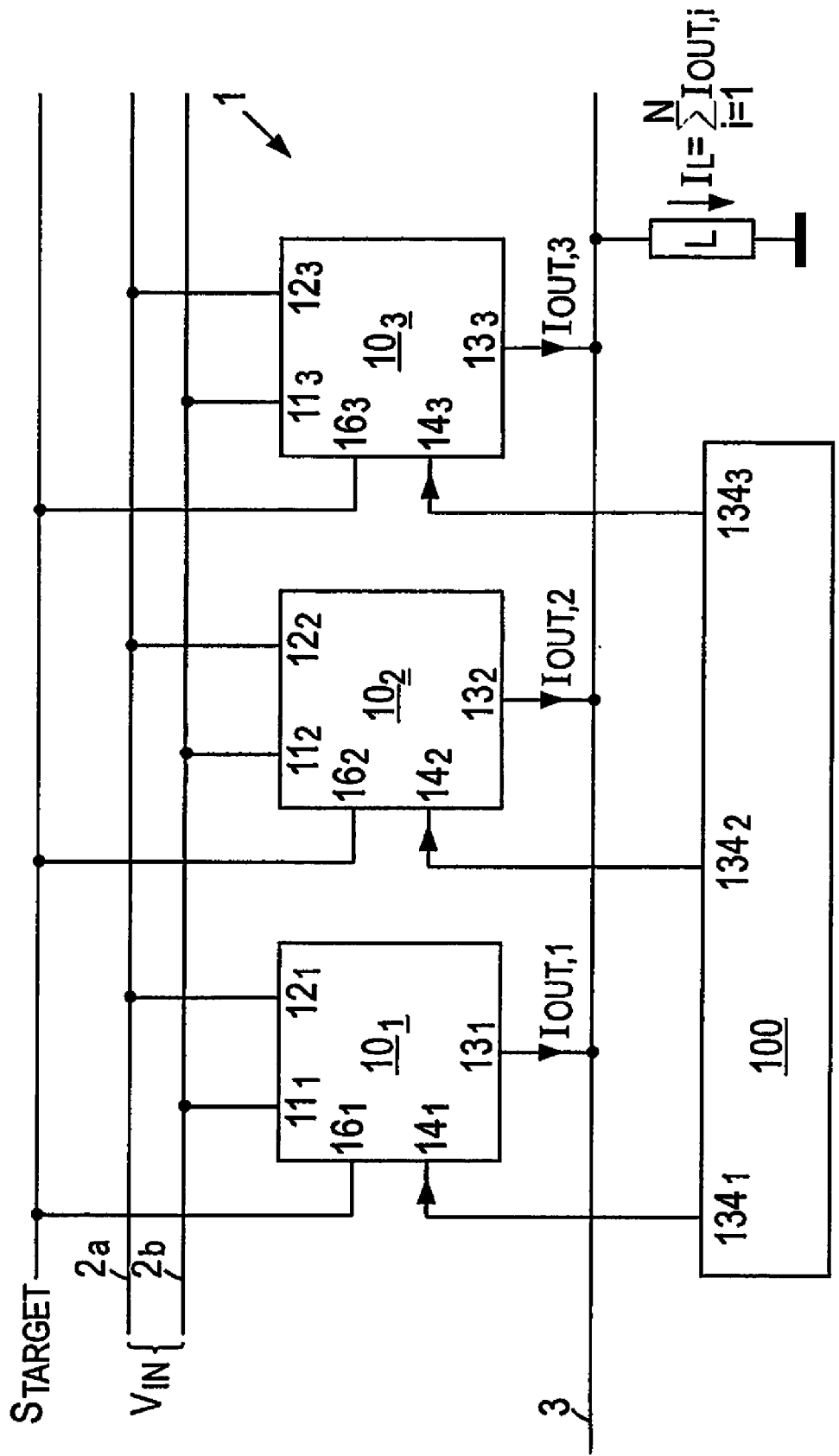
FIG. 3 is a block diagram schematically illustrating a power supply assembly.

FIG. 3 is a block diagram schematically showing part of a converter assembly 1 comprising a plurality of converter units 10 connected in parallel. In the following, same components of the individual converter units will be indicated by the same reference numerals, distinguished by an index 1, 2, 3, etc. In FIG. 3, only three converter units $10_1$, $10_2$ and $10_3$ are shown, but the assembly 1 can easily be extended by adding converter units. Further, the converter assembly 1 may comprise only two converter units, by taking one of the converter units away.

In the following explanation, it is assumed that the converter units 10 receive an input DC voltage $V_{IN}$ and generate an output current $I_{OUT}$. Each converter unit $10_i$ has two input terminals $11_i$ and $12_i$ connected to voltage supply lines 2a and 2b, respectively, for receiving the input voltage $V_{IN}$, and an output terminal $13_i$ connected to an output line 3 for providing the output current $I_{OUT,i}$. Herein, i=1, 2, 3 . . . etc. The converter units 10 are connected in parallel, i.e. their respective first input terminals $11_i$ are all connected together to one voltage supply line 2a, their respective second input terminals $12_i$ are all connected together to one voltage supply line 2b, and their respective output terminals $13_i$ are all connected together to one output line 3, which is connected to a load L. The load current $I_L$ can be written as the following formula:

$$I_L = \sum_{i=1}^{N} I_{OUT,i}$$

wherein N is an integer indicating the total number of converter units 10, N being 3 in the example of FIG. 3.

According to an important aspect of the present invention, each converter unit $10_i$ has a control input $14_i$. Further, the assembly 1 comprises a control device 100 having a plurality of control outputs $134_i$, each control output $134_i$ being coupled to a corresponding control input $14_i$ of a respective converter unit $10_i$. Although it is possible that the control device 100 is implemented in hardware, the control device 100 preferably is implemented as a programmable device, for instance an EPLD.

It will be seen that the modular design of the converter assembly 1 can easily be amended by taking one of the converter units away. For instance, the converter unit $10_2$ can be taken away, in which case control output $134_2$ is not connected.

Also, the control assembly 1 can easily be extended by adding a further converter unit $10_X$ (not shown in FIG. 3), in which case the control input $14_X$ of the added control unit $10_X$ is connected to a further control output $134_X$.

Figure 4:
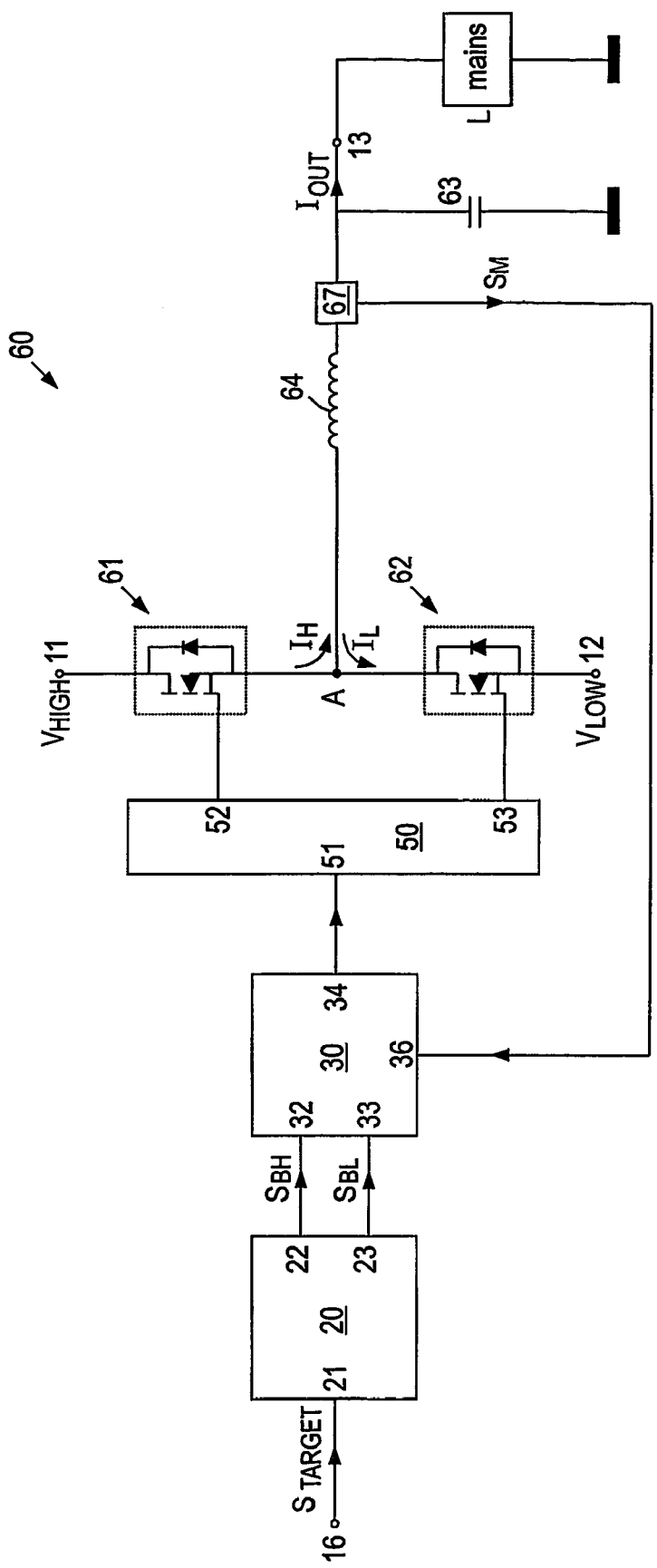
FIG. 4 is a block diagram schematically illustrating a power supply unit.

The general design of converter units is known per se. A possible embodiment of a known converter unit, suitable to be used as basis for a converter unit of the present invention, will be described with reference to FIG. 4. The converter unit 10 of this example comprises a half-bridge switching amplifier 60, the heart of which is formed by a pair of controlled switches 61 and 62, usually implemented as a pair of MOSFETS, connected in series between on the one hand the first input terminal 11 for connection to a high supply voltage level $V_{HIGH}$ and on the other hand the second supply input terminal 12 for connection to a low supply voltage level $V_{LOW}$. The node A between these two controllable switches 61 and 62 connects to the output terminal 13 through a load inductor 64 connected in series. In FIG. 4, it is shown for this example that the load L connected to output terminal 13 can be a voltage source, for instance a chargeable battery or, as shown, standard mains. In such case, the voltage at output terminal 13 is constant, as determined by the mains. Typically, a filter capacitor 63 is connected in parallel to the output 13.

The controllable switches 61 and 62 have their control terminals connected to control outputs 52 and 53, respectively, of a gate driver 50. The gate driver 50 is designed to operate in two possible operative states.

In a first operative state, the gate driver 50 generates its control signals for the controllable switches 61 and 62 such that the first switch 61 is in its conductive state while the second switch 62 is in its non-conductive state.

In a second operative state, the gate driver 50 generates its control signals for the controllable switches 61 and 62 such that the second switch 62 is in its conductive state while the first switch 61 is in its non-conductive state.

The gate driver 50 is further designed to prevent the controllable switches 61 and 62 from conducting simultaneously at any time. Further, the gate driver 50 is designed to assure that predefined maximum on times and/or maximum off times are respected.

Thus, in the first operative state, the node A is connected to the high supply voltage level $V_{HIGH}$, and a current $I_H$ is generated between first supply input terminal 11 and output terminal 13. Filtered by the inductor 64, and depending on the voltage level at the output terminal 13 in relation to the high supply voltage level $V_{HIGH}$, this typically leads to a rising output current $I_{OUT}$, indicated by lines 65a and 65b in FIG. 5. In the second operative state, the node A is connected to the low supply voltage $V_{LOW}$, and a current $I_L$ is generated between second supply input terminal 12 and output terminal 13. Filtered by the inductor 64, this typically leads to a decreasing output current $I_{OUT}$, indicated by the lines 66a and 66b in FIG. 5.

It is noted that in the setup shown in FIG. 4, the output current $I_{OUT}$ is capable of passing zero and change direction. It is also possible to operate the driver 50 such that the output current $I_{OUT}$ is always positive or negative, i.e. does not change direction. In that case, one of the switches may always be kept OFF, or may be replaced by a non-controllable switch, or may even be replaced by a diode. Referring to FIG. 4, assume that the current is positive (i.e. flowing from the first supply input terminal 11 to the output terminal 13), and that first switch 61 is in its conductive state while the second switch 62 is in its non-conductive state. Then, the current magnitude will increase (line 65b in FIG. 5). When the first switch 61 is now switched to its non-conductive state, while the second switch 62 remains in its non-conductive state, a positive current with decreasing magnitude flows from the second supply input terminal 12 to the output terminal 13 via the diode of switch 62. It will be clear that the same effect is achieved if the second switch 62 is replaced by a diode. It will also be clear that the same effect is achieved more efficiently if the second switch 62 is switched to its conductive state.

The output current $I_{OUT}$ is measured, for instance by an output current sensor 67, which generates a signal $S_M$ indicating the measured output current, which is provided to a measured signal input 36 of a window comparator 30.

The window comparator 30 has a first input 32 receiving a first boundary input signal $S_{BH}$, and a second input 33 receiving a second boundary input signal $S_{BL}$, wherein the first boundary level $S_{BH}$ is higher than the second boundary level $S_{BL}$. In the following, these two boundary levels will be indicated as high boundary level $S_{BH}$ and low boundary level $S_{BL}$, respectively.

The window comparator 30 compares the measured signal $S_M$ with the two boundary levels $S_{BH}$ and $S_{BL}$ received at its first and second input 32 and 33, respectively. It is noted that, in order for the window comparator 30 to be able to compare the measured output signal $S_M$ with the boundary levels $S_{BH}$ and $S_{BL}$, the measured output signal $S_M$ should have the same dimension as the boundary levels, i.e. they should all be current signals or voltage signals. Therefore, if for instance the boundary levels $S_{BH}$ and $S_{BL}$ are defined as signals in the voltage domain, the output sensor 67 should provide its output signal $S_M$ as a signal in the voltage domain, too.

Figure 5:
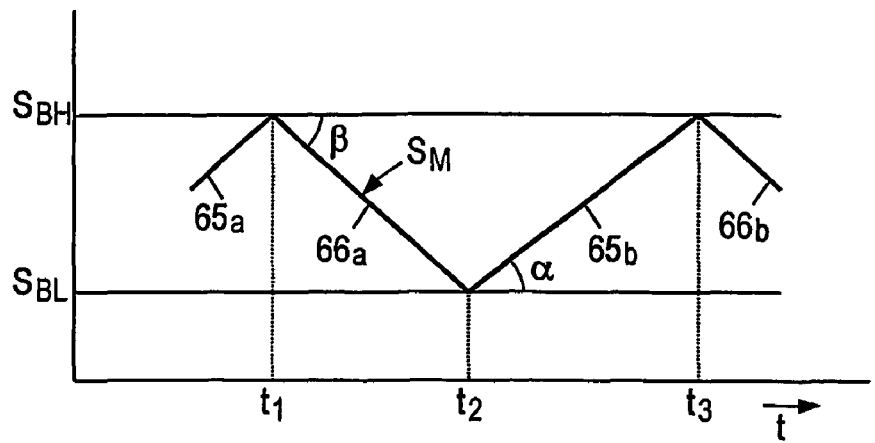
FIG. 5 is a time graph schematically illustrating the operation of a window comparator.

With reference to FIG. 5, the operation is as follows. Assume that the measured output current $I_{OUT}$ is within the window defined by the boundaries $S_{BH}$ and $S_{BL}$, and that the gate driver 50 is in the first operative state such that the output current $I_{OUT}$ is rising, as indicated by line 65a in FIG. 5. This situation continues, until at time t1 the measured output signal $S_M$ becomes equal to the high boundary level $S_{BH}$. At that moment, the window comparator 30 generates its output signal for the gate driver 50 such that the gate driver 50 switches to its second operative state. As a consequence, the output current $I_{OUT}$ decreases, as indicated by the line 66a in FIG. 5.

This situation continues, until at time t2 the lower boundary level $S_{BL}$ is reached. Now the window comparator 30 generates its output signal for the gate driver 50 such that the gate driver 50 again switches its operative state, i.e. enters the first operative state again, such that the output current $I_{OUT}$ is rising again, indicated by line 65b in FIG. 5.

On a time scale larger than the period of the output current $I_{OUT}$, the output current $I_{OUT}$ has an average value $I_{OUT,AV}$ approximately corresponding to $0.5 \cdot (S_{BH} + S_{BL})$, although the exact value of $I_{OUT,AV}$ will depend on the nature of the load.

Figure 6A:
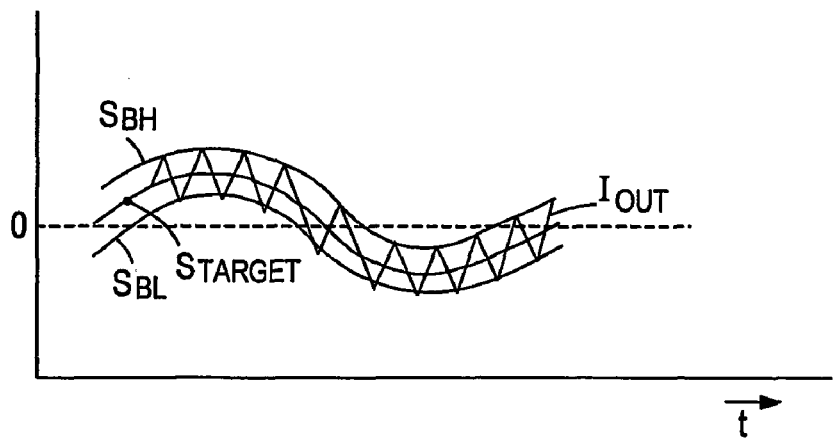
FIGS. 6A and 6B are time graphs schematically illustrating the operation of a boundary generator.

In a known converter unit, the window comparator 30 has its inputs 32 and 33 connected to outputs 22 and 23, respectively, of a boundary generator 20, which has an input 21 coupled to target input 16 of the converter unit 10. The boundary generator 20 is designed to generate the high boundary level signal $S_{BH}$ and the low boundary level signal $S_{BL}$ at its outputs 22 and 23, respectively, on the basis of the target signal $S_{TARGET}$ received at its input 21. This can be done in several ways. In a first exemplary embodiment, illustrated in FIG. 6A, the boundary generator 20 is adapted to generate its output signals according to the formulas $$S_{BH} = S_{TARGET} + S1; \quad S_{BL} = S_{TARGET} - S2$$

wherein S1 and S2 are constant values which may be equal to each other. Thus, in this example, the window boundaries $S_{BH}$ and $S_{BL}$ follow the shape of the target signal $S_{TARGET}$, as illustrated in FIG. 6A. This figure also shows the resulting wave form of output current $I_{OUT}$. It will be seen that the average value $I_{OUT,AV}$ is substantially equal to the target signal $S_{TARGET}$.

Figure 6B:
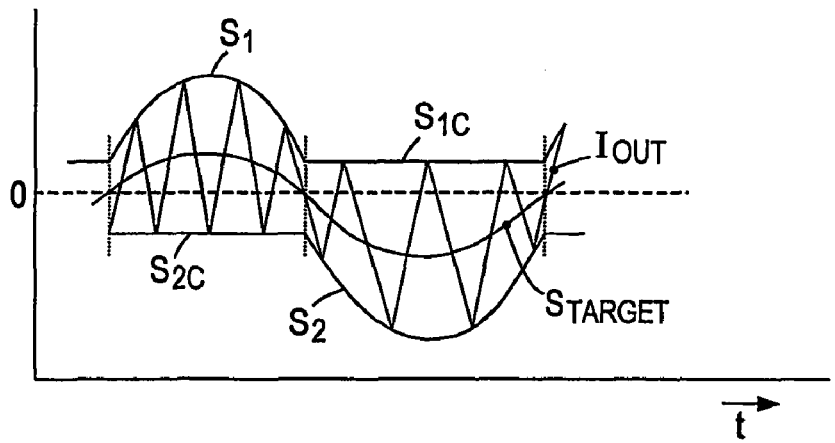

In another exemplary embodiment, illustrated in FIG. 6B, the boundary generator 20 assures that the high boundary level $S_{BH}$ is always positive and that the low boundary $S_{BL}$ is always negative. As long as the target signal $S_{TARGET}$ is above zero, the lower boundary level $S_{BL}$ has a constant value S2C below zero while the high boundary level S1 is chosen such that the average of S1 and S2C corresponds to the target signal $S_{TARGET}$. When the target signal $S_{TARGET}$ is negative, the opposite is true, i.e. the high boundary level $S_{BH}$ has a constant positive value S1C while the low boundary level $S_{BL}$ has a value S2 selected such that the average of S2 and S1C corresponds to the target signal $S_{TARGET}$. In this case, too, the average value $I_{OUT,AV}$ of the output current $I_{OUT}$ will substantially correspond to the target signal $S_{TARGET}$.

Figure 7:
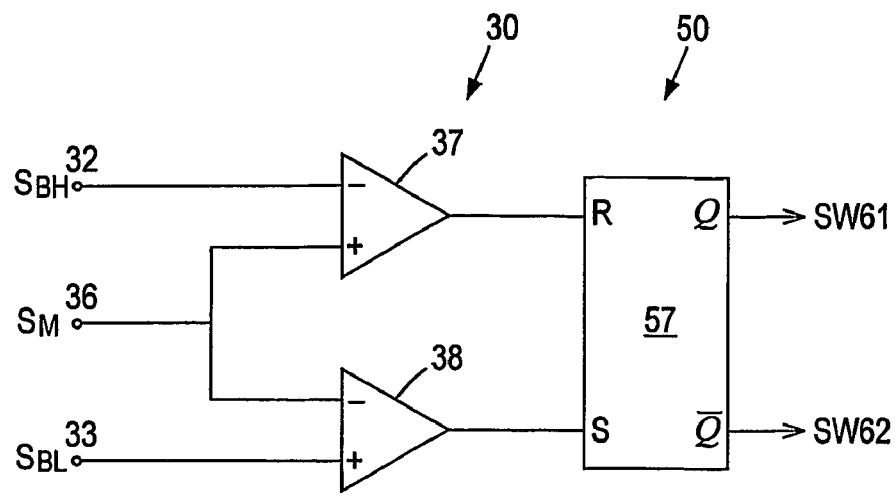
FIG. 7 is a block diagram schematically illustrating a possible embodiment of a window comparator and a gate driver.

FIG. 7 is a block diagram schematically illustrating a possible embodiment of a window comparator 30 and gate driver 50. In this embodiment, the window comparator 30 comprises a first voltage comparator 37 and a second voltage comparator 38, while the gate driver 50 comprises an RS flipflop 57. The first comparator 37 has an inverting input coupled to the first input 32 of the window comparator 30, has a non-inverting input coupled to the measured signal input 36 of the window comparator 30, and has an output coupled to the R-input of the RS flipflop 57. The second comparator 38 has a non-inverting input coupled to the second input 33 of the window comparator 30, has an inverting input coupled to the measured signal input 36 of the window comparator 30, and has an output coupled to the S-input of the RS flipflop 57. The Q-output of the RS flipflop 57 provides the drive signal for the first switch 61, while the $\overline{Q}$-output of the RS flipflop 57 provides the drive signal for the second switch 62.

The above description describes the operation of an independent converter unit 10. As such, the description given above can be considered as prior art. Now, the cooperation of a plurality of converter units in a converter assembly will be discussed with reference to FIG. 8, which is a timing diagram illustrating, by way of example, the output signal of two converter units as a function of time. As in FIG. 5, horizontal lines $S_{BH}$ and $S_{BL}$ indicate boundary levels, now for both converter units. Curve 111 indicates the first output signal of a first converter unit. The first output signal starts to rise at time t0, rises to meet the high boundary level $S_{BH}$ at time t1, then falls to meet the low boundary level $S_{BL}$ at time t2. Again, first output signal rises to meet the high boundary level $S_{BH}$ at time t3, then falls to meet the low boundary level $S_{BL}$ at time t4. The basic period P of this signal is P=|t2−t0|.

Dashed curve 112 indicates the timing of the second output signal of a second converter unit in an ideal case, when the first and second output signals have exactly opposite phases, or a phase difference of 180°: in that case, the summation of these two signals will have a ripple as low as possible. In this ideal timing, the second output signal of the second converter unit has a lowest peak at time t5 between t0 and t2, and has a highest peak at time t6 between t1 and t3.

Assume that the said second output signal of a second converter unit is delayed with respect to said ideal case, the delayed situation being illustrated by curve 113. It can be seen that the said second output signal 113 meets the low boundary level $S_{BL}$ at a time t7=t5+Δt5.

In the inventor's earlier proposal, a remedy for this situation is given by adding a sloping signal to the boundary levels; in the present invention, a different approach is taken.

Figure 9:
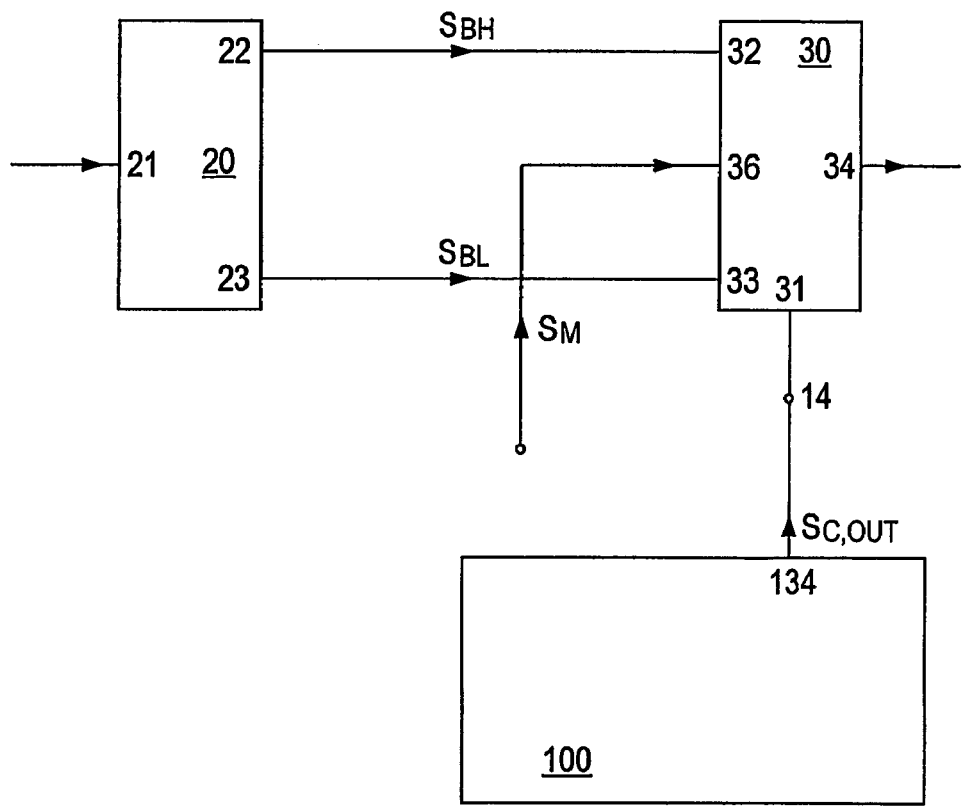
FIG. 9 is a block diagram schematically illustrating a detail of a power supply unit in accordance with the present invention.

In order for the converter unit 10 to be able to be applied in a converter assembly 1 according to the invention, as illustrated in FIG. 3, the converter unit 10 has a control input 14, coupled to a control input 31 of the window comparator 30, as illustrated in the partial drawing of FIG. 9. The control device 100 is designed to generate at its corresponding control output 134$_i$ a synchronisation control output signal $S_{C,OUT}$, in a manner as will be explained later. The window comparator 30 of the converter unit 10 is designed to generate its output signal for the gate driver 50 in response to the synchronisation control output signal $S_{C,OUT}$, in such a way that the synchronisation control output signal $S_{C,OUT}$ takes precedence over the fact whether or not the unit output signal has reached one of the boundary levels or not.

Figure 8:
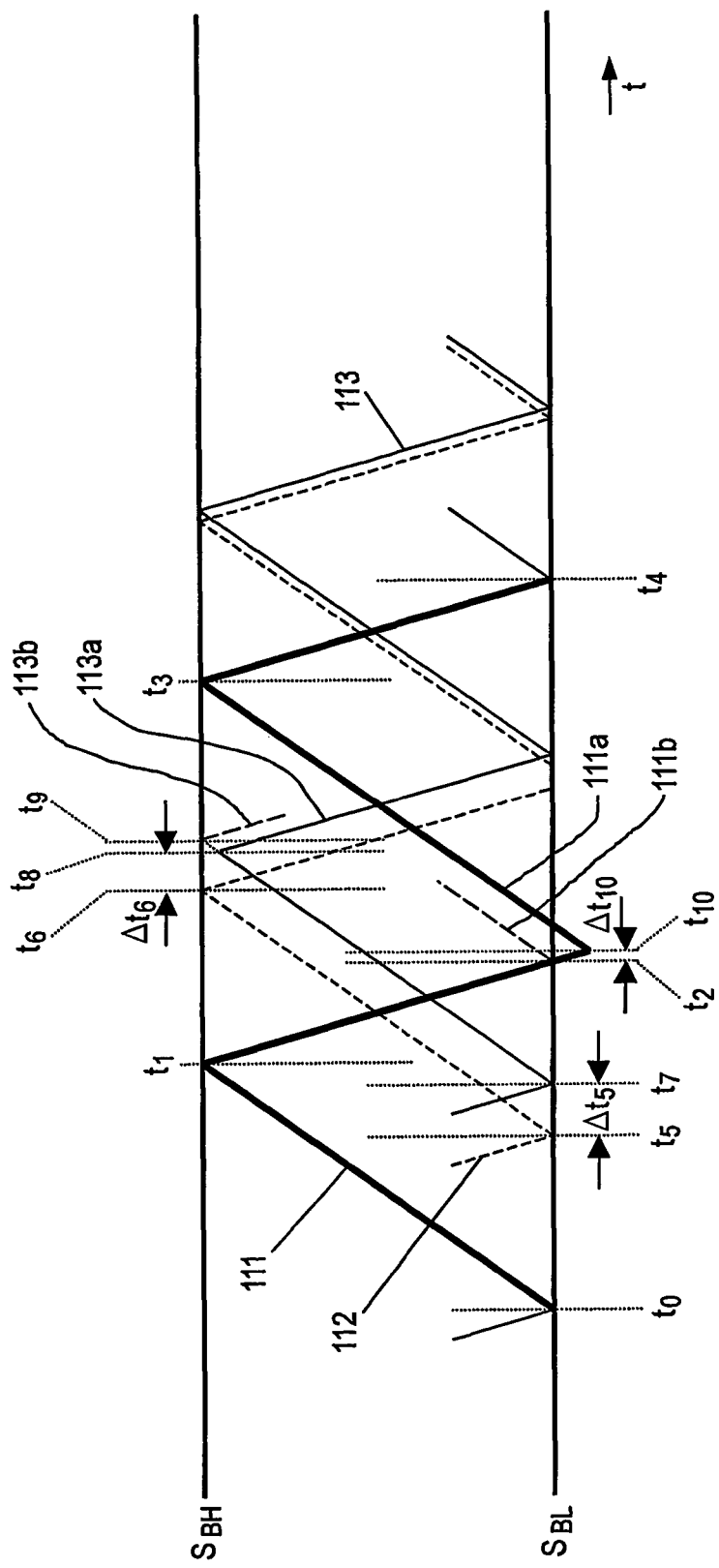
FIG. 8 is a time graph schematically showing the interrelationship of converter unit output signals in order to illustrate phase mismatch and compensating synchronisation.

According to the present invention, the control device 100 monitors the relative timing of the output signals of the converter units and, in the example of FIG. 8, finds that there is a timing difference Δt5 between t7 and t5. Based on this finding, the control device 100 may undertake one of the following two synchronisation control actions, but preferably undertakes both control actions.

In a first control action, the control device 100 generates the synchronisation control output signal $S_{C,OUT}$(2) for the second converter unit such that the corresponding gate driver 50(2) switches from its first operative state to its second operative state at a time t8 for which t8−t6=Δt6<Δt5 applies, i.e. before the second converter unit output signal reaches the high boundary level $S_{BH}$, which was expected to happen at a time t9=t6+Δt5 if no synchronisation control action would have been undertaken. This will decrease the phase difference or timing difference between the two converter unit output signals, as can be seen in FIG. 8 from the fact that downward sloping second output signal (curve portion 113a) is now earlier than (dashed) curve portion 113b, which illustrates the expected second converter unit output signal if no synchronisation control action would have been undertaken.

In a second control action, the control device 100 generates the synchronisation control output signal $S_{C,OUT}$(1) for the first converter unit such that the corresponding gate driver 50(1) switches from its second operative state to its first operative state at a time t10 for which t10−t2=Δt10>0 applies, i.e. after the first converter unit output signal has reached the low boundary level $S_{BL}$ at time t2. This will decrease the phase difference or timing difference between the two converter unit output signals, as can be seen in FIG. 8 from the fact that upward sloping first output signal (curve portion 111a) is now later than (dashed) curve portion 111b, which illustrates the expected first converter unit output signal if no synchronisation control action would have been undertaken.

The control device 100 has some freedom in setting the advance |t9−t8| and the delay |t10−t2|. It is noted that, after the synchronisation control actions illustrated in FIG. 9, the phase mismatch between the first and second control unit output signals is less than the phase mismatch without synchronisation control action. In principle, because the control device 100 obtains information on all switching moments, it is possible to exactly calculate the expected switching moments and the ideal switching moments, and it is possible for the control device 100 to generate its synchronisation control output signals $S_{C,OUT}$(1) and/or $S_{C,OUT}$(2) in such a way that the phase mismatch is compensated completely in one step. However, this is not necessary, and it may even involve the risk of overcompensation, which may lead to instability. Thus, preferably, the control device 100 is designed to generate its synchronisation control output signals $S_{C,OUT}$(1) and/or $S_{C,OUT}$(2) in such a way that the phase mismatch is reduced partly.

For instance, assume that the phase mismatch is to be compensated by adapting the synchronisation of the first converter unit output signal 111 only, by delaying its switching from t2 to t10. The necessary delay Δt10 can be calculated as $$\Delta t_{10} = K \cdot (t_7 - (t_6 - \tfrac{1}{2}P))$$

wherein K is a constant factor depending on the wave shape of the respective first and second converter unit output signals. In the case of exactly triangular waveforms, the respective first and second converter unit output signals having mutually identical waveforms, K is equal to the duty cycle of the signals. Then, in a preferred embodiment, as explained above, the control device 100 is designed to generate its second synchronisation control output signal $S_{C,OUT}$(2) in such a way that a delay $\Delta t_{10}$ is obtained in accordance with the formula $$\Delta t_{10} = K1 \cdot (t_7 - (t_6 - \tfrac{1}{2}P))$$

wherein K1<K. For instance, K1 may be expressed as a predefined percentage of K: K1=α·K, α being for instance 10%.

However, calculating $\Delta t_7$ in this way involves rather complicated multiplication procedures. Preferably, the delay $\Delta t_{10}$ is calculated in accordance with the formula $$\Delta t_{10} = K2 \cdot (t_7 - (t_6 - \tfrac{1}{2}P))$$

wherein K2 is a predefined constant factor, which is defined such that it is smaller than the expected minimum value of the duty cycle K, which may depend on the operating conditions like minimum and maximum input and output voltages of the converter units. Advantageously, K2 is equal to ½ or ¼ or ⅛ or 1/16, etc, because division by 2, 4, 8, 16, etc can easily be implemented by a shift register or the like.

The respective control outputs $134i$ of the control device 100 may each be a single output, and the respective control output signals $S_{C,OUT}$ may each be a signal showing different values for indicating different commands.

For instance, the output signal $S_{C,OUT}$ may
  have a constant value at all times, for instance a value zero, as long as the switching moments are to be determined on the basis of the converter output signal reaching one of the boundary levels;
  show a signal pulse having a first characteristic at time t8 in order to trigger switching before the converter output signal reaches one of the boundary levels;
  and show a signal pulse having a second characteristic from time t2 to time t10 in order to delay switching after the converter output signal has reached one of the boundary levels.

For instance, the first characteristic may be a first sign while the second characteristic may be opposite sign. Alternatively, the pulses may have the same sign but different height. Alternatively, the pulses may have the same sign but different duration.

Alternatively, the first characteristic may be identical to the second characteristic, wherein the switching is always inhibited as long as the signal pulse is HIGH or LOW after the initial pulse edge (transition from zero to HIGH or from zero to LOW, respectively) and wherein the switching is always triggered by the second edge of the pulse (returning from HIGH to zero or from LOW to zero, respectively).

It is also possible that the respective control outputs $134i$ of the control device 100 each are actually constituted by two lines, one line carrying a switching triggering signal and the other line carrying a switching inhibiting (delaying) signal.

Likewise, the control input 14 of a converter unit 10 may be a single input, or an input comprising two input lines, corresponding to the configuration of the control device 100, as will be clear to a person skilled in the art.

Figure 10:
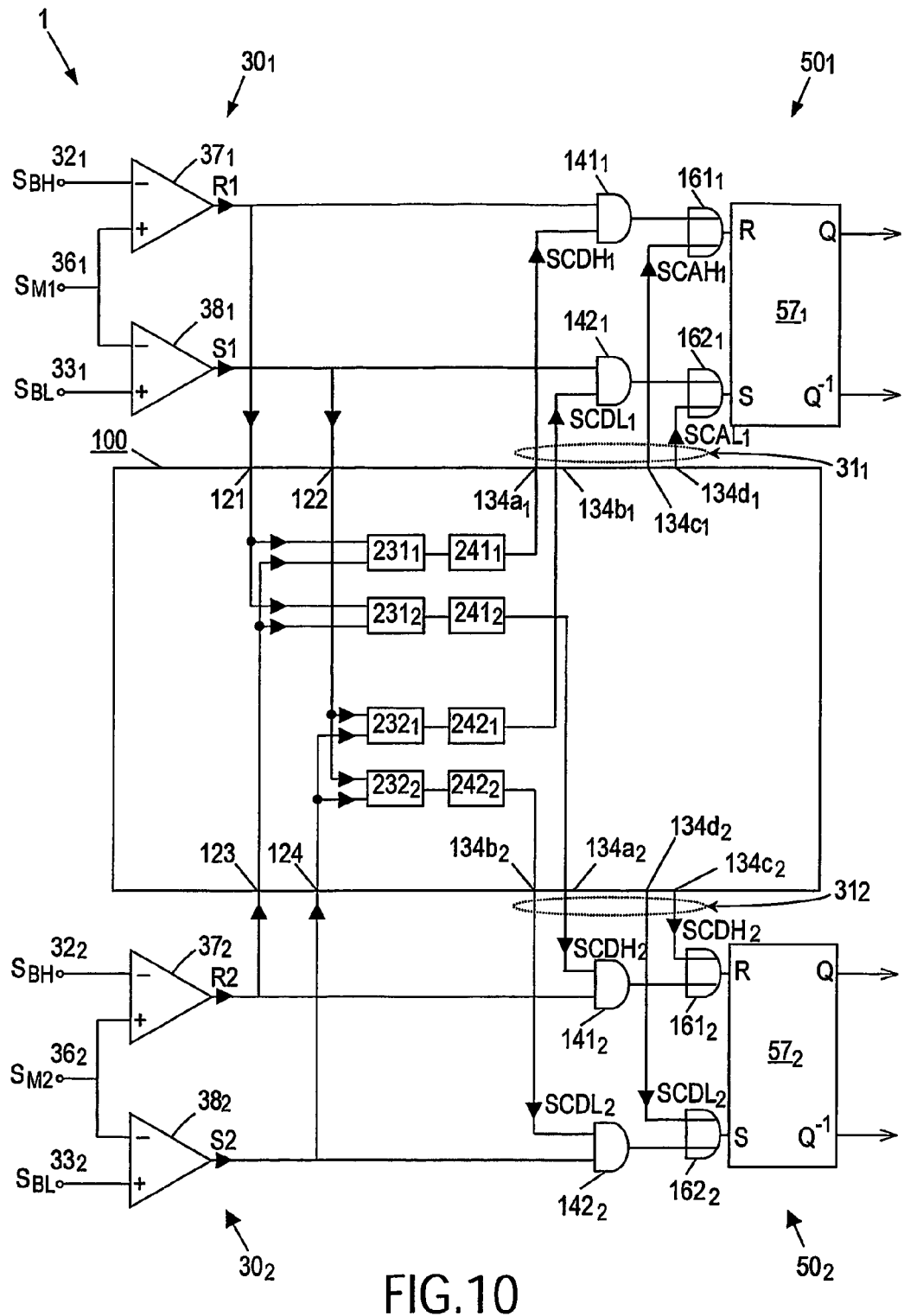
FIG. 10 is a block diagram schematically illustrating a power supply assembly in accordance with the present invention.

FIG. 10 is a block diagram, comparable to FIG. 7, of the window comparators and the gate drivers of an exemplary converter assembly which only comprises two converter units. In FIG. 10, the same reference numerals are used as in FIG. 7, supplemented by an index 1 or 2 to distinguish between the different converter units. The set signals from the second comparators $38_1$ and $38_2$, respectively, are indicated as S1 and S2, respectively, while the reset signals from the first comparators $37_1$ and $37_2$, respectively, are indicated as R1 and R2, respectively. The control device 100 has inputs 121, 122, 123, 124 receiving said set and reset signals.

Figure 11:
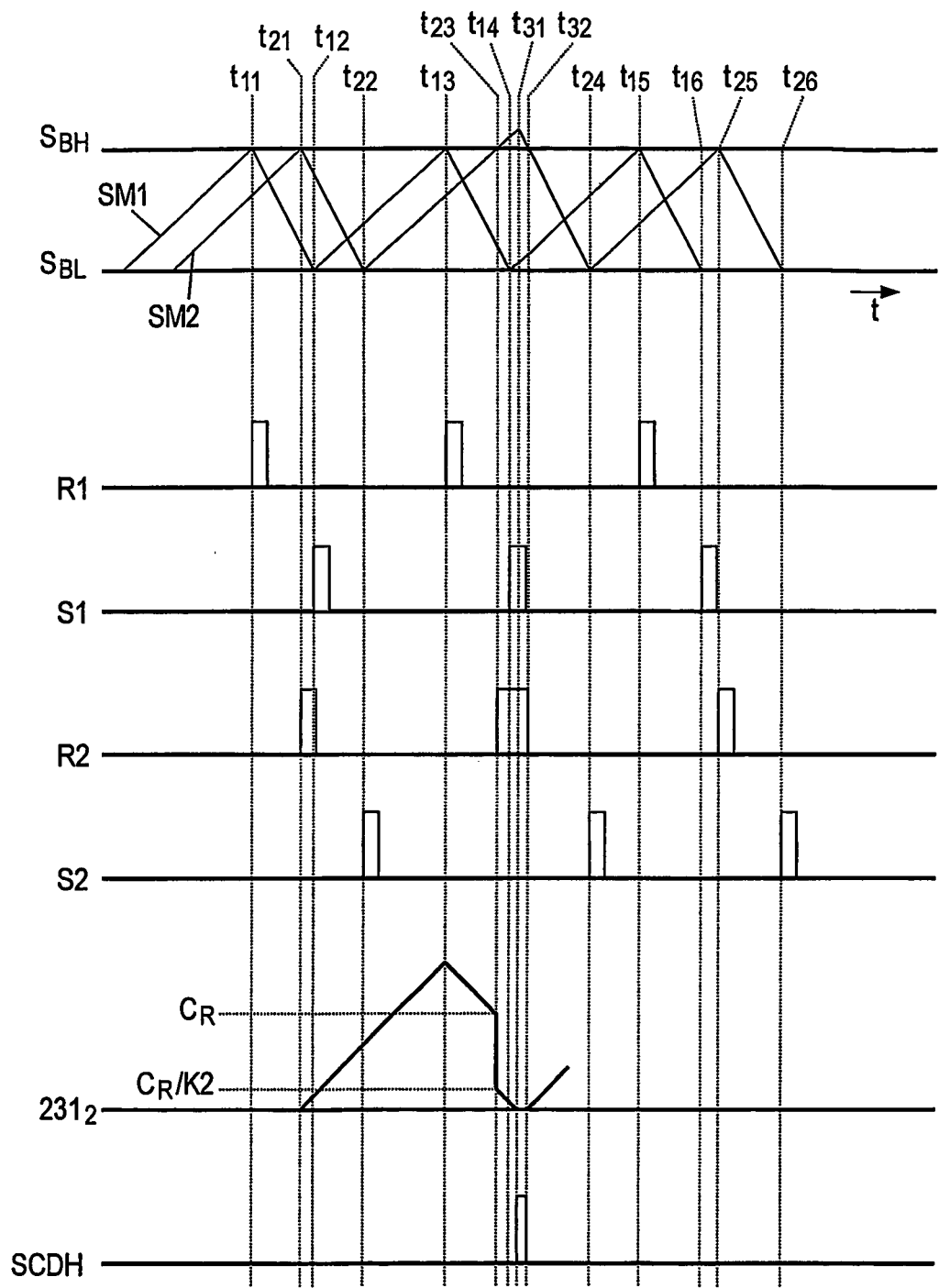
FIG. 11 is a time graph schematically illustrating the operation of the power supply assembly of FIG. 10.

FIG. 11 is a timing diagram, showing the set signals and the reset signals as a function of time in relation to the measured output signals SM1 and SM2, respectively. The first output signal SM1 reaches the high boundary level $S_{BH}$ at times t11, t13, t15, leading to reset pulses R1 which trigger a switch from upward sloping to downward sloping output signal SM1. The first output signal SM1 reaches the low boundary level $S_{BL}$ at times t12, t14, t16, leading to set pulses S1 which trigger a switch from downward sloping to upward sloping output signal SM1.

Likewise, the second output signal SM2 reaches the high boundary level $S_{BH}$ at times t2, t23, t25, leading to reset pulses R2 which trigger a switch from upward sloping to downward sloping output signal SM2. The second output signal SM2 reaches the low boundary level $S_{BL}$ at times t22, t24, t26, leading to set pulses S2 which trigger a switch from downward sloping to upward sloping output signal SM2.

Assume that the first output signal SM1 is initially lagging with respect to the second output signal SM2. In the following, a description will be given of the operation of the control device 100 for compensating the delay of first output signal SM1 by delaying the second output signal SM2.

For synchronising the second converter unit, the control device 100 comprises a first timer function, implemented as an up/down-counter $231_2$, which is triggered by the reset signals R1 and R2. Assume that the counter value is zero. At time t21, the counter $231_2$ starts to count up with a certain up-speed, triggered by second reset signal R2 of the second converter unit $10_2$. At time t13, the counter $231_2$ starts to count down with a certain down-speed substantially equal to the up-speed, triggered by first reset signal R1 of the first converter unit $10_1$; the counter value at time t13 is a measure for the duration of the time interval t21-t13. At time t23, the second output signal SM2 reaches the high boundary level $S_{BH}$, but this happens too early so that, at this time t23, the counter $231_2$ still has a remaining counter value $C_R$ larger than zero; this counter value $C_R$ is a measure for the difference between the duration of the time interval t13-t23 and the duration of the time interval t21-t13.

The control device 100 now inhibits the switching of second flipflop $57_2$, as illustrated by the second output signal SM2 continuing to slope upwards beyond the high boundary level $S_{BH}$ at time t23. To this end, the converter units $10_i$ each comprise a first AND gate $141_i$ coupled between the first voltage comparator $37_i$ and the reset input of the flipflop $57_i$. The first AND gate $141_1$ [$141_2$] has one input receiving the reset signal R1 [R2] from the first voltage comparator $37_1$ [$37_2$], and has its output coupled to the reset input of the flipflop $57_1$ [$57_2$]. The first AND gate $141_1$ [$141_2$] has a second input connected to a first synchronisation control output $134a_1$ [$134a_2$] of the control device 100.

The control device 100 has a first delay signal generator $241_i$, having its input coupled to the first counter $231_i$, designed to generate a first delaying synchronisation control signal $SCDH_1$ [$SCDH_2$], which is provided at the corresponding first synchronisation control outputs $134a_i$. The first delay signal generator $241_i$ is designed to generate its first delaying synchronisation control signal $SCDH_1$ [$SCDH_2$] as a LOW signal as long as the counter value of the corresponding counter $231_i$ differs from zero, and to make its first delaying synchronisation control signal $SCDH_1$ [$SCDH_2$] HIGH as soon as the counter value of the corresponding counter $231_i$ becomes zero. Thus, the flipflop $57_2$ of the second converter unit $10_2$ is reset only when the counter $231_2$ reaches zero at time t31.

The second output signal SM2 now starts to slope downwards, but it takes until time t32 for the second output signal SM2 to drop below the high boundary level $S_{BH}$, at which time the output signal R2 from the first voltage comparator $37_2$ of the second converter Unit $10_2$ switches from HIGH to LOW. This event triggers the counter $231_2$ again to start counting up.

At time t23, the control device 100 is designed to reduce the counter value by dividing the remaining counter value $C_R$ by a predefined constant factor K2, as explained earlier. The length of the delay, i.e. the duration of the time interval from t23 to t32, is determined by the counter value $C_R$/K2 at time t23 and the down-counting speed of the counter.

The above explains delaying the second converter unit with respect to the first. In order to delay the first converter unit with respect to the second, the first counter $231_1$ for the first converter unit $10_1$ is triggered by the first reset signal R1 to count up, and is triggered by the second reset signal R2 to count down.

The above explains delaying the second converter unit with respect to the first (and the first converter unit with respect to the second) at the moments in time when the corresponding output signals reach the corresponding high boundary level $S_{BH}$. It is also possible to delay the first [second] converter unit $10_1$ [$10_2$] at the moments in time when the corresponding output signal reaches the corresponding low boundary level $S_{BL}$. To that end, the control device 100 has second up/down counters $232_i$, which are triggered by the SET signals S1 and S2, and each converter unit $10_i$ has a second AND gate $142_i$ between the second voltage comparator $38_i$ and the set input of the corresponding flipflop $57_i$. The second AND gate $142_1$ [$142_2$] has one input receiving the set signal S1 [S2] from the second voltage comparator $38_1$ [$38_2$], and has its output coupled to the set input of the flipflop $57_1$ [$57_2$]. The second AND gate $142_1$ [$142_2$] has a second input connected to a second synchronisation control output $134b_1$ [$134b_2$] of the control device 100.

The control device 100 has a second delay signal generator $242_i$, having its input coupled to the second counter $232_i$, designed to generate a second synchronisation delaying control signal $SCDL_i$, which is provided at the corresponding second synchronisation control outputs $134b_i$. The second delay signal generator $241_i$ is designed to generate its second delaying synchronisation control signal $SCDL_i$ as a LOW signal as long as the counter value of the corresponding counter $232_i$ differs from zero, and to make its second delaying synchronisation control signal $SCDL_i$ HIGH as soon as the counter value of the corresponding counter $232_i$ becomes zero. Thus, the flipflop $57_2$ of the second converter unit $10_2$ is set only when the counter $232_2$ reaches zero.

Operation at the high boundary level $S_{BL}$ is similar as operation in the case of delaying at the high boundary level $S_{BH}$, and a repeated explanation is omitted here.

With reference to FIG. 11, delaying one converter unit with respect to the other has been described in great detail. In a preferred embodiment, it is also possible to advance one converter unit with respect to the other. To that end, each converter unit 10 can have a first OR gate $161_i$ coupled between the first AND gate $141_i$ and the reset input of the corresponding flipflop $57_i$ (for advancing at the moments in time when the corresponding output signal approaches the corresponding high boundary level $S_{BH}$), and/or a second OR gate $162_i$ coupled between the second AND gate $142_i$ and the set input of the corresponding flipflop $57_i$ (for advancing at the moments in time when the corresponding output signal approaches the corresponding low boundary level $S_{BL}$). The first OR gate $161_i$ has one input receiving the output signal from the first AND gate $141_i$, and has its output connected to the reset input of the flipflop $57_i$. The second OR gate $162_i$ has one input receiving the output signal from the second AND gate $142_i$, and has its output connected to the set input of the flipflop $57_i$. The first and second OR gates $161_i$ and $162_i$ each have a second input coupled to respective synchronisation control outputs $134c_i$ and $134d_i$ of the control device 100, where the control device 100 provides respective first and second advancing synchronisation control signals $SCAH_i$ and $SCAL_i$.

The control device 100 is designed to monitor the timing of the set and reset signals from the window comparators, and, when it finds that one converter unit is lagging with respect to the other, to calculate a timing for an advancing synchronisation control signal $SCAH_i$ or $SCAL_i$ in the form of a HIGH pulse, which directly sets or resets the corresponding flipflop of the corresponding converter unit.

Alternatively, it is also possible that the converter assembly 1 only has the facility of advancing one converter unit with respect to the other, in which case the counters and And gates as described above can be omitted.

In the above, the gist of the invention has been explained for an exemplary embodiment of a converter assembly comprising exactly two converter units. The same gist applies in a case of a converter assembly comprising three or more converter units. In that case, the converter units can be indicated as $10_i$, i ranging 1, 2, 3, 4, etc. The previous discussion regarding converter units $10_1$ and $10_2$ applies to each consecutive pair of converter units $10_i$ and $10_{(i+1)}$.

In the case of only two converter units, a phase difference of 180° between the output currents of those two converter units is considered ideal, assuming that the two output currents have identical shape. Therefore, in the exemplary embodiment discussed with respect to FIGS. 10 and 11, the counter down-speed is selected equal to the counter up-speed, so that, in the steady state case, the duration of time interval t21-t13 is substantially equal to the duration of time interval t13-t23. In an embodiment with N converter units, in the steady state case, assuming that all converter units in the converter assembly are substantially identical, the ideal phase difference between two neighbouring converter units is substantially equal to 360°/N. This is achieved if the down-counting speed of each counter is equal to (N−1) times its up-counting speed.

For determining whether a converter unit $10_i$ has a correct phase, its output signal may be compared with a predefined one of the other output signals. In that case, N comparisons are made, and all target phase differences are equal to 360°/N. It is, however, also possible to take one converter unit $10_1$ as a reference unit, and to compare the phases of all other converter units $10_{i(i \neq 1)}$ with the phase of this one converter unit $10_1$. In that case, N−1 comparisons are made, and all target phase differences are different.

It should be clear to a person skilled in the art that the resulting overall output current of the converter assembly, being the summation of all individual output currents of the individual converter units, will have only very small ripple amplitude.

Thus, the present invention succeeds in providing a switched mode power supply assembly, comprising at least two switched mode power supply units coupled to each other in parallel;

each power supply unit having an output stage capable of selectively operating in a first mode wherein its output signal is increasing and operating in a second mode wherein its output signal is decreasing;

a control device receiving mode switch control signals from all power supply units;

wherein the control device, if it finds that the actual phase relationship between two power supply units deviates from an optimal phase relationship, is designed to generate synchronising control signals for at least one power supply unit, effectively changing the timing of at least one mode switch moment, such that the deviation between the actual phase relationship and said optimal phase relationship is reduced.

It should be clear to a person skilled in the art that the present invention is not limited to the exemplary embodiments discussed above, but that several variations and modifications are possible within the protective scope of the invention as defined in the appending claims.

For instance, in the above, the present invention is explained for a converter having two controllable switches 61 and 62 connected in series. However, the present invention is not limited to devices having two controllable switches connected in series; it is sufficient if only one of said switches is controllable. For instance, with reference to FIG. 4, second switch 62 may be replaced by a (non-controllable) diode having its cathode directed to node A, or first switch 61 may be replaced by a (non-controllable) diode having its anode directed to node A (buck-type converter). Since converters of this type are known per se, while it will be clear to a person skilled in the art that the gist of the present invention also applies to converters of this type, it is not necessary here to discuss the operation of such converters in great detail. It is noted, however, that in such case the corresponding current is not hysteresis-controlled. For instance, in the case where second switch 62 is replaced by a (non-controllable) diode having its cathode directed to node A, hysteresis control is only executed on the rising current becoming equal to the high-boundary level. A low boundary level for the dropping current is always zero. Detecting when the dropping current becomes equal to zero may be done in the manner described above, but can also be done in other ways in this special case.

In the above, the present invention has been explained for an implementation in a half-bridge configuration. However, it should be clear to a person skilled in the art that the present invention can also be implemented in a full-bridge configuration.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:

1. Switched mode power supply assembly comprising:
   a plurality of switched mode power supply units coupled to each other in parallel, each power supply unit comprising:
   an output stage for generating an output signal, the output stage being capable of selectively operating in a first mode wherein the output signal is increasing and operating in a second mode wherein the output signal is decreasing; and
   mode switch control means for generating a first mode switch control signal for controlling the output stage to switch from the first operating mode to the second operating mode, and for generating a second mode switch control signal for controlling the output stage to switch from the second operating mode to the first operating mode; and
   a control device comprising inputs for receiving the mode switch control signals from all of the plurality power supply units;
   wherein the control device is designed to determine an optimal phase relationship between phases of the mode switch control signals of one power supply unit and phases of the mode switch control signals of a reference power supply unit;
   wherein the control device is designed to compare the phases of the mode switch control signals of said one power supply unit with the phases of the mode switch control signals of said reference power supply unit to determine an actual phase relationship; and
   wherein the control device is designed to generate synchronising control signals for at least one of said one power supply unit and said reference power supply unit when the control device finds that the actual phase relationship deviates from the optimal phase relationship, effectively changing the timing of at least one mode switch moment of at least one of said one power supply unit and said reference power supply unit, respectively, such that the deviation between the actual phase relationship and said optimal phase relationship is reduced, in order to ensure interleaved operation of all of the plurality of power supply units.

2. Switched mode power supply assembly according to claim 1, wherein the control device is designed to generate a delaying synchronising control signal for said reference power supply unit when the control device finds that said one power supply unit is lagging with respect to said optimal phase relationship, effectively delaying the timing of at least one mode switch moment of said reference power supply unit.

3. Switched mode power supply assembly according to claim 1, wherein the control device is designed to generate an advancing synchronising control signal for said one power supply unit when the control device finds that said one power supply unit is lagging with respect to said optimal phase relationship, effectively advancing the timing of at least one mode switch moment of said one power supply unit.

4. Switched mode power supply assembly according to claim 1, wherein the control device is designed to generate a delaying synchronising control signal for said one power supply unit when the control device finds that said one power supply unit is early with respect to said optimal phase relationship, effectively delaying the timing of at least one mode switch moment of said one power supply unit.

5. Switched mode power supply assembly according to claim 1, wherein the control device is designed to generate an advancing synchronising control signal for said reference power supply unit when the control device finds that said one power supply unit is early with respect to said optimal phase relationship, effectively advancing the timing of at least one mode switch moment of said reference power supply unit.

6. Switched mode power supply assembly according to claim 1, wherein the control device is designed to generate its synchronising control signals such that the phase mismatch is completely compensated in one step.

7. Switched mode power supply assembly according to claim 1, wherein the control device is designed to generate its synchronising control signals such that the phase mismatch is reduced by a predetermined constant factor K2.

8. Switched mode power supply assembly according to claim 1, wherein the control device is designed to calculate a first time difference between a first time when the output signal of said one power supply unit reaches a first boundary level and a second time when the output signal of said reference power supply unit reaches the same first boundary level;
   wherein the control device is designed to calculate a second time difference between said second time and a third time when the output signal of said one power supply unit reaches said first boundary level again;
   wherein the control device is designed to calculate the difference between said first time difference and said second time difference;
   wherein the control device is designed to divide said calculated difference by a predetermined factor to yield a delay time; and
   wherein the control device is designed to generate a delaying synchronising control signal for said one power supply unit such that said one power supply unit switches its operating mode at a delayed switching time calculated as said third time plus said delay time.

9. Switched mode power supply assembly according to claim 1, wherein the output stage of each power supply unit comprises at least one input coupled to an output of an AND gate, the AND gate comprising an input receiving a command signal from the corresponding mode switch control means and another input receiving a delaying synchronising control signal from the control device.

10. Switched mode power supply assembly according to claim 1, wherein the output stage of each power supply unit comprises at least one input coupled to an output of an OR gate, the OR gate comprising an input receiving a command signal from the corresponding mode switch control means and another input receiving an advancing synchronising control signal from the control device.

11. Switched mode power supply assembly according to claim 1, wherein all of the power supply units are mutually identical.

12. Switched mode power supply assembly according to claim 1, wherein each power supply unit further comprises a target signal input, all of the target signal inputs of all of the power supply units being connected in parallel to one common target signal source.

13. Switched mode power supply assembly according to claim 1, wherein each power supply unit further comprises a current output, all of the current outputs of all of the power supply units being connected in parallel to one common assembly output.

14. Switched mode power supply assembly according to claim 1, wherein each power supply unit further comprises a first supply input and a second supply input, all of the first supply inputs of all of the power supply units being connected in parallel to one common high voltage supply source, and all of the second supply inputs of all of the power supply units being connected in parallel to one common low voltage supply source.

15. Switched mode power supply assembly according to claim 1, wherein the output stage of each power supply unit comprises:

two controllable switches coupled in series between a first supply input and a second supply input, a node between said switches being coupled to a module output;

a switch driver comprising outputs respectively coupled to control inputs of the switches, the switch driver being capable of operating in a first operative state in which it generates control output signals such that the second switch is non-conductive while the first switch is in a conductive state, and being capable of operating in a second operative state in which it generates control output signals such that the first switch is non-conductive while the second switch is in a conductive state; and wherein the mode switch control means of each power supply unit comprises:

a window comparator comprising a high boundary input and a low boundary input, a control output coupled to a control input of said switch driver, and a measuring signal input coupled to receive a measuring signal from a current sensor;

wherein the window comparator is adapted to generate a first control signal commanding said switch driver to enter the first operative state when said measuring signal becomes equal to a low signal level at a low boundary input of the measuring signal, and to generate a second control signal commanding said switch driver to enter the second operative state when said measuring signal becomes equal to a high signal level at a high boundary input of the measuring signal.

16. Switched mode power supply assembly according to claim 1, wherein the mode switch control means are designed for generating a first mode switch control signal controlling the output stage to switch from the first operating mode to the second operating mode when the output signal rises to a first boundary level and for generating a second mode switch control signal controlling the output stage to switch from the second operating mode to the first operating mode when the output signal falls to a second boundary level.

* * * * *